May 27, 1969     R. J. JORDAN     3,447,014
INTERFEROMETER COMPRISING PHOTOCATHODE OF FRACTIONAL
LIGHT WAVELENGTH THICKNESS IN ENVELOPE
HAVING OPTICALLY FLAT WINDOWS
Filed June 27, 1966

*INVENTOR*
ROBERT J. JORDAN

BY *Paris, Haskell & Levine*
ATTORNEYS

United States Patent Office 3,447,014
Patented May 27, 1969

3,447,014
INTERFEROMETER COMPRISING PHOTOCATHODE OF FRACTIONAL LIGHT WAVELENGTH THICKNESS IN ENVELOPE HAVING OPTICALLY FLAT WINDOWS
Robert J. Jordan, Lexington Park, Md., assignor of one-third to Robert B. Davis, Hollywood, Md., and one-third to Ronald N. Phillips, Leonardtown, Md.
Filed June 27, 1966, Ser. No. 560,703
Int. Cl. H01j *39/16*
U.S. Cl. 313—94     5 Claims

ABSTRACT OF THE DISCLOSURE

An optical interferometer for relating external coherent light beams comprised of an evacuated envelope having opposed transparent windows, a semitransparent cathode, and an anode; and converting a two dimensional light interference pattern of said beams on said cathode into electrical signals.

---

Figure 2:
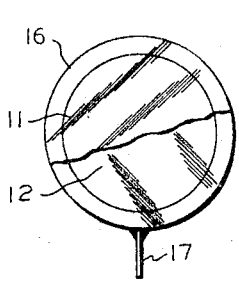

The present invention relates generally to a mixer and more particularly to such a device for combining radiant energy beams.

With the advent of the laser and similar devices the need for more sophisticated electro-optical devices and systems becomes ever increasing. The prior art discloses a trend toward more complex and costly electro-optical systems to meet the demands created by the myriad of uses to which radiant energy is being put. For example, optical interferometers now utilize vastly expensive and complex reflection, translation and transmission systems to split, manipulate and thereafter recombine a beam or beams of radiant energy. This energy is thereafter translated into electrical signals for further processing by electronic circuitry to achieve a desired output.

Another area of development now under study is the art of optical communications wherein a modulated source of radiant energy will transmit an optical signal to a distant receiver station wherein the received signal is demodulated to recover the information desired. Optical to electrical signal transducers, processing equipment, and the like have been envisioned as requiring vast quantities of extremely expensive equipment which must be adjusted and maintained in precise tolerances to make such systems operable. This invention obviates the necessity of such complex devices.

The present invention provides a structurally unitary inexpensive photodiode which is bidirectionally transmissive, mixes a plurality of incoming beams of radiant energy and supplies an electrical signal indicative of such combination. Such a device has application in many systems which utilize electro-magnetic energy, and has particular application to devices with use of beams of coherent energy in the far infra-red to far ultraviolet spectrum. It is to be understood that the applications for such a device are numerous and are in no way limited to the examples enumerated hereinbefore or those to be discussed hereinafter. This device is limited in application only by the state-of-the-art of photocathode materials.

An object of the present invention is the provision of a mixer for use in a radiant energy systems.

Yet a further object of the invention is to provide such a mixer which is bidirectionally transmissive.

A still further object is the provision of a bidirectionally transmissive mixer which also serves as a radiant to an electrical energy transducer.

Another object is the provision of a radiant energy mixer and transducer which is extremely small in size, embodied in a single structural entity, inexpensive, rigid and very reliable.

Figure 1:
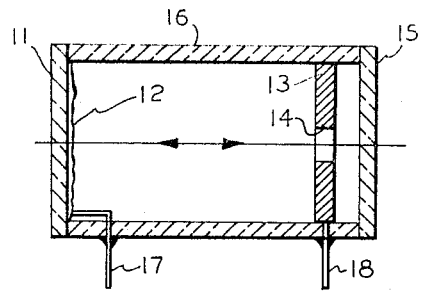
Figure 3:
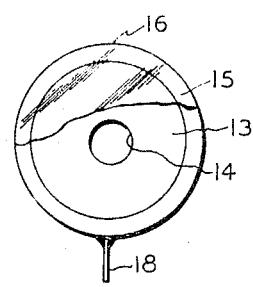
Figure 4:
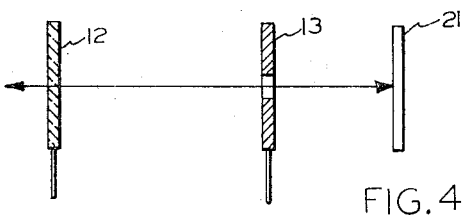
Figure 5:
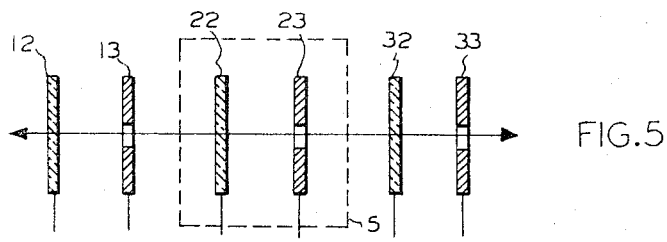
Figure 6:
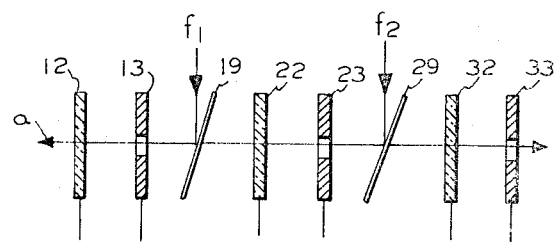
Figure 7:
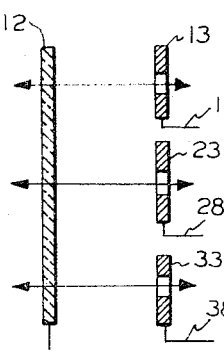
Figure 8:
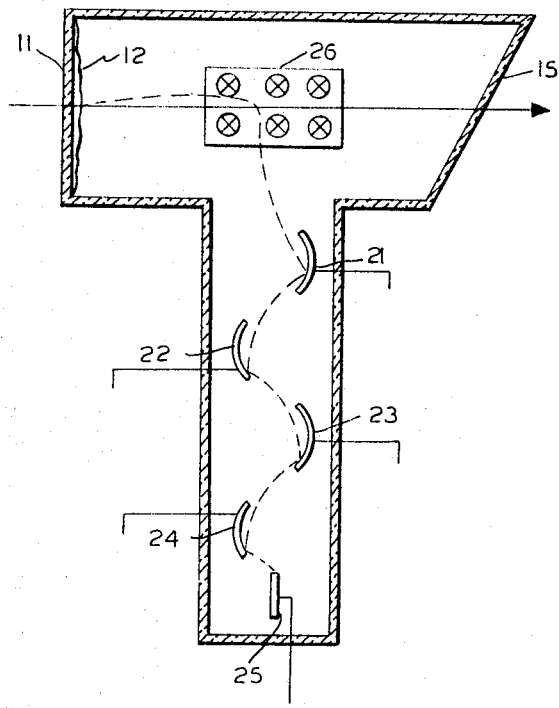
Figure 9:
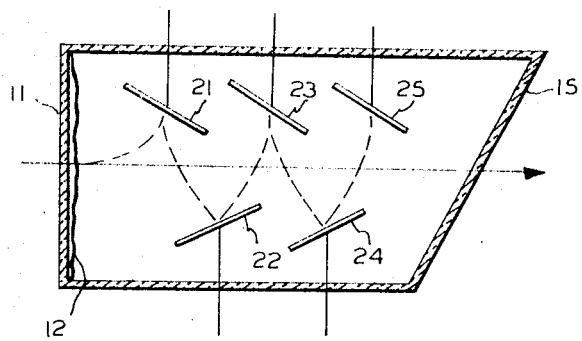

Other objects and many of the attendant advantages of the invention will be readily appreciated as the same becomes better understood by reference to the following description when considered in conjunction with the accompanying drawings in which like reference numerals designate like parts throughout the figures thereof and wherein:

FIG. 1 is a cutaway side view of an embodiment of the invention;
FIG. 2 is a front view of the embodiment of FIG. 1;
FIG. 3 is a rear view of the embodiment of FIG. 1;
FIG. 4 is a schematic representation of a possible environment for the embodiment of FIGS. 1 to 3;
FIG. 5 depicts a schematic representation of another embodiment of the invention having a plurality of photocathodes and anodes;
FIG. 6 is a schematic representation of yet another embodiment of the invention having a plurality of photocathodes, anodes, and reflectors;
FIG. 7 is a schematic representation of a further embodiment of the invention utilizing a single photocathode and a plurality of anodes;
FIG. 8 is a schematic representation of a photomultiplier employing the inventive concept; and
FIG. 9 is another form of photomultiplier employing the concept of the invention.

Referring now to the drawings, there is shown in FIG. 1 an embodiment of the invention having a substantially planar window 11 composed of glass, quartz, or like transparent material, on which is deposited a photoemissive cathode 12 which is semitransparent. The cathode 12 is shown in the front view of FIG. 2. Spaced from the cathode is a conductive anode 13 having an aperture formed therein, designated 14, as shown in FIG. 3. In proximity to the anode is another substantially flat window 15. This window 15 may be canted to avoid reflections. The elements disclosed are suitably mounted in a wall or envelope 16 which is evacuated. The device may be built as shown wherein the window 11, 15 and wall 16 are one integral device or they may be separate elements which are suitably joined. Leads 17 and 18 are connected to the cathode and anode, respectively, and brought through apertures in the wall 16, which are subsequently sealed, for communication with external circuitry.

In operation an incident beam of energy traveling through window 11, semitransparent cathode 12 and substantially normal thereto, the aperture 14 in anode 13 and exiting window 15 will activate the photosensitive layer 12 in a well known manner causing a signal to be produced, obtainable across leads 17 and 18 with an accelerating potential applied to the anode via lead 18. Obviously, rather than a positive potential on lead 18 a negative potential may be applied to lead 17. Similarly, an additional incident beam or the reflection of the original beam traveling in the opposite direction, that is from window 15, through the aperture 14 in anode 13, through cathode 12 and window 11 will activate the photoemissive cathode to produce a further signal on leads 17 and 18. Most important is the fact that a beam traveling in either direction is not deterred or diverted in its path but is transmitted through the device without distortion. With two or more beams transmitted through the device, the output signal appearing on leads 17 and 18 is a function of both of the beams.

Thus, as disclosed hereinbefore, an application for such a device may be as an interferometer. As shown in FIG. 4, an incident beam of coherent light passes through the device from cathode 12 to anode 13 and is subsequently reflected from an object 21 in the path of the beam. The reflected beam passes through the device from anode 13 to cathode 12 and impinges upon substantially the same photocathode area of cathode 12.

The reflected and incident beams of energy will differ in frequency if there is relative motion between the reflector and the device. Furthermore, the beams will differ in phase angle if there is not an integral number of wavelengths between the reflector and the device. In one device built in accordance with the invention, an incident beam of energy at an input wavelength of 6328A° was used and difference frequencies between 0 to 2 megacycles were measured.

In this device, the entrance and exit windows 11 and 15 were flat within one quarter of a wavelength or roughly 1500 A., the photoemissive material 12 was no thicker than 1000 A. and the reflecting surface was substantially flat.

Another embodiment of this device is shown in FIG. 5 with a plurality of photocathodes 12, 22, 32 and a plurality of anodes 13, 23, 33. With such an embodiment a number of output signals may be generated. One environment in which such a device would find utility would be where a spectrum of frequencies carry information. By placing each set of anodes and cathodes in a tuned environment such as that shown schematically by reference numeral 5, various of the frequencies present in the beams may be extracted. Provision may be made to adjust the spacing of the cathodes.

The invention also contemplates more than one envelope structure for plural cathode-anode sets. It is well within the contemplation of the inventor to utilize a number of evacuated envelopes. Particularly since by practicing this invention the ray energy enters and exits an envelope without being diffused.

FIG. 6 depicts still another embodiment wherein a plurality of anodes 13, 23, 33, are used. Between each of the photocathodes is a partially silvered mirror 19, 29, 39, or other suitable optical device whereby a different reference signal or beam of energy $f_1$ or $f_2$ may be directed at each individual set of anodes and cathodes yet allowing transmission of a single incident beam of energy $a$, having a plurality of information frequency modulated carriers $f_1$ and $f_2$ multiplexed thereon. Thus allowing extraction of the information on a multiplexed beam.

In similar manner a single photocathode 12 and a plurality of apertured anodes 13, 23, 33 may be used as shown in FIG. 7. Each of the anodes may have a different reference beam traversing through the aperture therein, impinging upon the transparent photocathode. As a result of the cathodic activity of the incident beam or beams and the reference beams, the accelerating voltage on each of the anodes will cause electrons to flow to the anode causing a signal to appear on the respective one of leads 18, 28, and 38 representative of the mixture of the particular beams.

FIG. 8 depicts a novel photomultiplier tube employing the inventive concept. The tube has a substantially planar entrance window 11 with a photoemissive cathode deposited thereon and exist window 15. Substantially perpendicular to the axis of said windows is a further tubular member having dynodes 21 to 24 and anode 25 arranged on alternate sides thereof. The entire assembly is sealed together and evacuated in a well known manner. Means 26 for applying a magnetic field is shown. Such means may be an electromagnet or the like.

A beam of light entering the multiplier from either window 11 or 15 will impinge upon the emissive surface 12 and liberate electrons therefrom which will tend to travel towards exit window 15 as shown by the dotted line. The magnetic field in accordance with well known principles will cause the electron path to be altered and said electrons to impinge upon dynode 21. Electrons will be liberated from dynode 21 and impinge upon dynodes 22, 23, 24 in turn finally arriving at anode 25, in a well known manner. The signal appearing upon lead attached to the anode is dependent upon the voltage impressed on the dynodes and is a function of the energy impinging upon surface 2. Thus, by utilizing the concepts of the present invention, a photomultiplier is shown which does not destroy, deter or otherwise divert the activating energy beam or beams.

FIG. 9 illustrates a further photomultiplier which is particularly adapted for use in the present invention. There is shown a photomultiplier comprising a tube 16 having an entrance window 11 on which is deposited a thin layer of semitransparent photoemissive marterial 12 and an exit window 15. A plurality of dynodes 21 to 24 are arranged successively about the axis of length of the tube and an anode 25 is arranged as shown. Accelerating potentials are applied to the tube elements in a well known manner. The absence of a magnetic accelerating or focusing field is noted. A beam of ray energy passes from window 11, normal to cathodic surface 12 through window 15. The dotted line represents the path of electrons. Note that the accelerating potential on the dynodes 21 to 24 and anode 25 alone is sufficient to cause successive liberation of electrons from the surface 12, liberated by the energy beam to strike dynode 21 which liberates electrons therefrom following the path shown to dynode 22 and so forth. A signal indicative of the beam of ray energy striking the surface 12 is available at the lead from the anode structure 25.

Obviously as stated hereinbefore the spectrum of operation of the device is limited only by the state-of-the-art of the photoemissive material or materials of the cathode. Hence the size, the absorption ratio, and like qualities are dependent thereupon and upon the characteristics and quality of the beams directed thereat.

Although but limited numbers of embodiments of the invention have been illustrated and described, it is believed evident that many variations may be made by those skilled in the art without departing from the spirit and scope of this invention. Accordingly this invention should be considered as being limited only by the following claims appended hereto.

What is claimed is:

1. An interferometer for determining the relationship of externally directed coherent light beams comprising an evacuated envelope having first and second transparent windows displaced along an optical axis, said windows being disposed substantially normal to coherent light directed along said axis and having surfaces that are planar within a fraction of the wavelength of the frequency of the coherent light to avoid disturbing the wave front of a beam of coherent light directed along said axis in either direction, said second window being slightly canted with respect to the first window along said axis to minimize spurious reflections and to permit substantally free and undistorted traversal of coherent light in either direction along said axis and through said first and second windows of the envelope, a semitransparent planar photosensitive layer disposed inside said envelope substantially normal to said axis, said layer having a precisely uniform thickness and planar surface in the region of said optical axis with said thickness being a fraction of the wavelength of the coherent light beam, an anode disposed within said envelope in spaced realationship to said layer and arranged to permit unobstructed passage of coherent light through said envelope along said optical axis in either direction, the relationship of said windows and said photosensitive layer being such that a pair of coherent light beams along said axis entering said envelope from opposite directions provide a substantially planar two dimensional interference pattern on said photosensitive layer whose thickness in the direction of said axis is less than the wavelength of the light permitting a precise determination of the characteristic relationship of the beams.

2. The device of claim 1 wherein said anode has an aperture therein and said beam of energy passes therethrough.

3. In the interferometer of claim 1, a plurality of said anodes and said photosensitive layers provided inside said envelope in spaced relation and wherein said photosensitive layers are substantially parallel and equal in number to said anodes.

4. The device of claim 1 wherein said anode is displaced from said axis.

5. An interferometer for determining the relationship of a pair of coherent light beams comprising an evacuated envelope having spaced transparent windows for passage of said light beams through said envelope, said windows having surfaces that are planar within a fraction of the wavelength of said beam, a semitransparent photosensitive layer supported inside the envelope and having a region traversable by said beams that is of uniform thickness at a fraction of the wavelength of the beams, an anode supported inside said envelope in spaced relationship to said layer and disposed to permit unobstructed passage of coherent light through said envelope from either window, said windows and said portions of the layer being substantially transverse to said beams to provide a substantially two dimensional interference pattern of said beams at said layer portion.

References Cited

UNITED STATES PATENTS

| | | | |
|---|---|---|---|
| 2,172,727 | 9/1939 | Bruche et al. | 313—66 X |
| 2,878,406 | 3/1959 | Bergson | 313—102 |
| 2,919,364 | 12/1959 | Sprick | 313—102 X |
| 2,983,836 | 5/1961 | Rudnick et al. | 313—94 |

FOREIGN PATENTS

| | | |
|---|---|---|
| 225,445 | 1/1943 | Switzerland. |
| 706,173 | 3/1954 | Great Britain. |

ROBERT SEGAL, *Primary Examiner.*

U.S. Cl. X.R.

250—216; 313—98; 350—163